United States Patent
Yamauchi et al.

(10) Patent No.: US 9,200,940 B2
(45) Date of Patent: Dec. 1, 2015

(54) FUEL CONSUMPTION DISPLAY APPARATUS FOR CRANE

(75) Inventors: Hiroshi Yamauchi, Kagawa (JP); Kimihiko Terata, Kagawa (JP)

(73) Assignee: TADANO LTD., Kagawa (JP)

( * ) Notice: Subject to any disclaimer, the term of this patent is extended or adjusted under 35 U.S.C. 154(b) by 172 days.

(21) Appl. No.: 13/347,967

(22) Filed: Jan. 11, 2012

(65) Prior Publication Data
US 2012/0185159 A1 Jul. 19, 2012

(30) Foreign Application Priority Data

Jan. 14, 2011 (JP) .................................... 2011-6238
Jan. 14, 2011 (JP) .................................... 2011-6240

(51) Int. Cl.
 *B66C 13/16* (2006.01)
 *B66C 13/18* (2006.01)
 *G01F 9/00* (2006.01)
 *G01F 15/075* (2006.01)

(52) U.S. Cl.
 CPC ............ *G01F 15/0755* (2013.01); *B66C 13/16* (2013.01); *B66C 13/18* (2013.01); *G01F 9/001* (2013.01)

(58) Field of Classification Search
 CPC ..... B66C 13/16; B66C 13/18; G01F 15/0755; G01F 9/001
 USPC ......................................................... 701/123
 See application file for complete search history.

(56) References Cited

U.S. PATENT DOCUMENTS

| 7,880,436 | B2 * | 2/2011 | Fischer et al. ................. 320/124 |
| 2005/0288850 | A1 | 12/2005 | Sato |
| 2007/0073468 | A1 | 3/2007 | Tsukamoto |
| 2011/0276261 | A1 * | 11/2011 | Mizutani ....................... 701/123 |

FOREIGN PATENT DOCUMENTS

| GB | 2419333 | 4/2006 |
| JP | S61-135223 U | 8/1986 |
| JP | 2001-289110 | 10/2001 |
| JP | 2004-325259 A | 11/2004 |
| JP | 2005-98988 A | 4/2005 |

(Continued)

OTHER PUBLICATIONS

EP patent application No. 12000183.9, Partial EP Search Report mailed Jun. 6, 2012.

(Continued)

*Primary Examiner* — Nga X Nguyen (57) ABSTRACT

A fuel consumption display apparatus for a crane includes: standby state determining means for determining whether or not a crane is in a standby state; fuel consumption detecting means for detecting fuel consumption of the crane; standby accumulated fuel consumption calculating means for calculating standby accumulated fuel consumption by accumulating the fuel consumption after the standby state determining means determines the crane to be in the standby state: the standby duration calculating means for calculating standby duration by measuring a time period after the standby state determining means determines the crane to be in the standby state; and a monitor for displaying the standby accumulated fuel consumption and the standby duration. An operator of the crane can therefore recognize how much fuel is wasted, thus facilitating an operation for reducing fuel consumption.

7 Claims, 7 Drawing Sheets

(56) References Cited

FOREIGN PATENT DOCUMENTS

| | | |
|---|---|---|
| JP | 2010-188961 A | 9/2010 |
| JP | 2010-203148 A | 9/2010 |
| WO | 2010/079691 | 7/2010 |
| WO | WO 2010079691 A1 * | 7/2010 |

OTHER PUBLICATIONS

Japan Patent Office, Office Action for Japanese Patent Application 2011-6238, Nov. 25, 2014.
Japan Patent Office, Office Action for Japanese Patent Application 2011-6240, Nov. 25, 2014.

* cited by examiner

| history number | measuring start time and date | standby fuel consumption | operational fuel consumption | average fuel consumption | workload |
|---|---|---|---|---|---|
| 0 | 12/14 14:49 | 219 | 224 | 0.6 | 8139 |
| 1 | 12/14 10:59 | 57 | 0 | 0.6 | 0 |
| 2 | 12/09 20:18 | 11 | 8 | 0.6 | 156 |
| 3 | 12/09 20:15 | 1 | 0 | 3.0 | 0 |
| 4 | 12/09 20:14 | 0 | 0 | 3.0 | 0 |
| 5 | 12/09 19:32 | 13 | 0 | 3.0 | 0 |

FUEL CONSUMPTION DISPLAY APPARATUS FOR CRANE

BACKGROUND OF THE INVENTION

1. Field of the Invention

The present invention relates to a fuel consumption display apparatus for a crane and, more specifically, to a fuel consumption display apparatus for a crane allowing an operator to operate a crane for reducing fuel consumption.

2. Description of the Related Art

Reducing unnecessary standby time of cranes generally enables to reduce fuel consumption. Standby means here a state where cranes are not operated. More specifically, cranes are not in a state of expanding/contracting or derricking a boom, tilting a jib, causing a winch to perform a winding or lowering operation, revolving a superstructure, extending or retracting outriggers, or the like.

When a power take-off apparatus, which takes off power for driving a hydraulic pump for a crane from an engine, is turned on (in a crane operable mode), fuel is consumed. This is because the hydraulic pump for a crane is driven even when the crane is not operating. There is, in fact, a case where an amount of fuel consumed during standby time accounts for a half of the total in the crane operable mode. This leads to a waste of fuel.

The fuel consumption of cranes significantly varies depending on how to operate them. For example, a velocity does not increase even when an engine RPM is increased in an operation for cylinder contraction such as tilting down or contracting of a boom. Therefore, increasing the engine RPM leads to a further waste of fuel.

Accordingly, it is assumed that providing a fuel consumption display apparatus on a crane allows an operator to operate the crane for reducing fuel consumption.

As an example, Japanese Patent Laid-Open No. 2005-98988 discloses a fuel consumption display apparatus applied to general vehicles or power shovels. However, there is no example that a fuel consumption display apparatus is applied to cranes.

Additionally, it is necessary to confirm an amount of fuel usage with respect to a workload of a crane for evaluating fuel efficiency in crane operation.

However, conventional fuel display apparatuses do not display a workload, thereby leading to failure in evaluating fuel efficiency.

In view of the above circumstances, an object of the present invention is to provide a fuel consumption display apparatus for a crane for displaying fuel consumption in a crane operable mode.

SUMMARY OF THE INVENTION

A fuel consumption display apparatus for a crane according to a first feature of the present invention includes: measuring means for measuring standby accumulated fuel consumption and standby duration in a standby state during a crane operable mode; and a monitor for displaying the standby accumulated fuel consumption and the standby duration measured by the measuring means.

A fuel consumption display apparatus for a crane according to a second feature of the present invention is the first feature of the present invention, wherein the measuring means includes: standby state determining means for determining whether or not a crane is in the standby state during the crane operable mode; fuel consumption detecting means for detecting fuel consumption of the crane; standby accumulated fuel consumption calculating means for calculating the standby accumulated fuel consumption by accumulating the fuel consumption after the standby state determining means determines the crane to be in the standby state; and standby duration calculating means for calculating the standby duration by measuring a time period after the standby state determining means determines the crane to be in the standby state, and the monitor includes: monitor control means for displaying, on the monitor, the standby accumulated fuel consumption input from the standby accumulated fuel consumption calculating means and the standby duration input from the standby duration calculating means.

A fuel consumption display apparatus for a crane according to a third feature of the present invention is the first feature of the present invention, wherein the measuring means measures instantaneous fuel consumption and average fuel consumption in a crane operational state in addition to the standby accumulated fuel consumption and the standby duration, and the monitor displays the instantaneous fuel consumption and the average fuel consumption in addition to the standby accumulated fuel consumption and the standby duration.

A fuel consumption display apparatus for a crane according to a fourth feature of the present invention is the third feature of the present invention, wherein the measuring means includes: fuel consumption detecting means for detecting fuel consumption of the crane; instantaneous fuel consumption calculating means for calculating the instantaneous fuel consumption from the fuel consumption; and average fuel consumption calculating means for calculating the average fuel consumption from an operational time and accumulated fuel consumption by measuring the operational time, namely a time period from the crane turning into the operational state up to the present, and by accumulating the fuel consumption after the crane turning into the operational state for calculating the accumulated fuel consumption, and the monitor includes: monitor control means for displaying, on the monitor, the instantaneous fuel consumption input from the instantaneous fuel consumption calculating means and the average fuel consumption input from the average fuel consumption calculating means.

A fuel consumption display apparatus for a crane according to a fifth feature of the present invention is the fourth feature of the present invention, wherein the measuring means includes: standby state determining means for determining whether or not a crane is in the standby state during the crane operable mode, and the monitor control means displays the instantaneous fuel consumption and the average fuel consumption on the monitor as long as the standby state determining means determines the crane not to be in the standby state, and displays the standby accumulated fuel consumption and the standby duration on the monitor as long as the standby state determining means determines the crane to be in the standby state.

A fuel consumption display apparatus for a crane according to a sixth feature of the present invention is the fifth feature of the present invention, wherein the monitor control means displays the instantaneous fuel consumption and the average fuel consumption on the monitor as long as the standby state determining means determines the crane not to be in the standby state, and displays the standby accumulated fuel consumption and the standby duration on the monitor after a predetermined period of time has elapsed since the standby state determining means determines the crane to be in the standby state.

A fuel consumption display apparatus for a crane according to a seventh feature of the present invention includes:

measuring means for measuring standby fuel consumption, operational fuel consumption, average fuel consumption and a workload in a crane operable mode; a fuel consumption table for storing the standby fuel consumption, the operational fuel consumption, the average fuel consumption and the workload measured by the measuring means as a history per a certain period of time; and a monitor for displaying the history of the standby fuel consumption, the operational fuel consumption, the average fuel consumption and the workload stored in the fuel consumption table.

A fuel consumption display apparatus for a crane according to a eighth feature of the present invention is the seventh feature of the present invention, wherein the measuring means includes: standby state determining means for determining whether or not a crane is in a standby state during the crane operable mode; fuel consumption detecting means for detecting fuel consumption of the crane; standby fuel consumption calculating means for calculating the standby fuel consumption by accumulating the fuel consumption as long as the standby state determining means determines the crane to be in the standby state from a measuring start time up to the present; operational fuel consumption calculating means for calculating the operational fuel consumption by accumulating the fuel consumption as long as the standby state determining means determines the crane not to be in the standby state from the measuring start time up to the present; average fuel consumption calculating means for calculating the average fuel consumption by measuring an operational time, namely a time period from the measuring start time up to the present, by adding the operational fuel consumption to the standby fuel consumption for calculating accumulated fuel consumption, and by dividing the operational time by the accumulated fuel consumption; and workload calculating means for calculating a workload from the measuring start time up to the present.

A crane according to a ninth feature of the present invention includes: a fuel consumption display apparatus for a crane according to the first, second, third, fourth, fifth, sixth, seventh, or eighth feature of the present invention.

According to the first feature of the present invention, the monitor displays the standby accumulated fuel consumption and the standby duration. An operator of the crane can therefore recognize how much fuel is wasted, thus facilitating an operation for reducing fuel consumption.

According to the second feature of the present invention, the monitor displays the standby accumulated fuel consumption and the standby duration. The operator of the crane can therefore recognize how much fuel is wasted, thus facilitating the operation for reducing fuel consumption.

According to the third feature of the present invention, the monitor displays the instantaneous fuel consumption and the average fuel consumption. The operator of the crane can therefore recognize whether or not an operation is for reducing fuel consumption, thus facilitating the operation for reducing fuel consumption.

According to the fourth feature of the present invention, the monitor displays the instantaneous fuel consumption and the average fuel consumption. The operator of the crane can therefore recognize whether or not an operation is for reducing fuel consumption, thus facilitating the operation for reducing fuel consumption.

According to the fifth feature of the present invention, the monitor displays the standby accumulated fuel consumption and the standby duration every time the crane turns into the standby state. The operator of the crane can therefore recognize how much fuel is wasted, thus facilitating the operation for reducing fuel consumption.

According to the sixth feature of the present invention, the monitor displays the standby accumulated fuel consumption and the standby duration after a predetermined period of time has elapsed since the standby state determining means determines the crane to be in the standby state. This can therefore prevent frequent changes of a screen during the crane operation.

According to the seventh feature of the present invention, the monitor displays the standby fuel consumption, the operational fuel consumption, the average fuel consumption and the workload. The operator can therefore evaluate efficiency of the fuel consumption during the crane operation by checking an amount of fuel usage with respect to the workload of the crane. Since the monitor also displays a history, the operator can comprehend the efficiency of the fuel consumption during the crane operation by comparing with fuel consumption in a past operation, thus facilitating the operation for reducing fuel consumption.

According to the eighth feature of the present invention, an operation of the measuring means enables a measurement of the standby fuel consumption, the operational fuel consumption, the average fuel consumption and the workload.

According to the ninth feature of the present invention, the monitor provided on the crane displays the standby accumulated fuel consumption, the standby duration, the instantaneous fuel consumption, and the average fuel consumption. The operator of the crane can therefore recognize how much fuel is wasted, thus facilitating the operation for reducing fuel consumption. The monitor also displays the standby fuel consumption, the operational fuel consumption, the average fuel consumption and the workload. The operator can therefore evaluate efficiency of the fuel consumption during the crane operation by checking an amount of fuel usage with respect to the workload of the crane. Further, since the monitor also displays a history, the operator can comprehend the efficiency of the fuel consumption during the crane operation by comparing with fuel consumption in a past operation, thus facilitating the operation for reducing fuel consumption.

DETAILED DESCRIPTION OF THE PREFERRED EMBODIMENT

Next, an embodiment of the present invention will be described with reference to the drawings.

A fuel consumption display apparatus A for a crane according to the embodiment of the present invention is provided on various types of cranes such as a mobile crane and displays instantaneous fuel consumption and a history of fuel consumption in a crane operable mode. Hereinafter, description will be made separately in the case of displaying the instantaneous fuel consumption and in the case of displaying the history of fuel consumption.

(Instantaneous Fuel Consumption)

In the case of displaying instantaneous fuel consumption will be first described.

Figure 1:
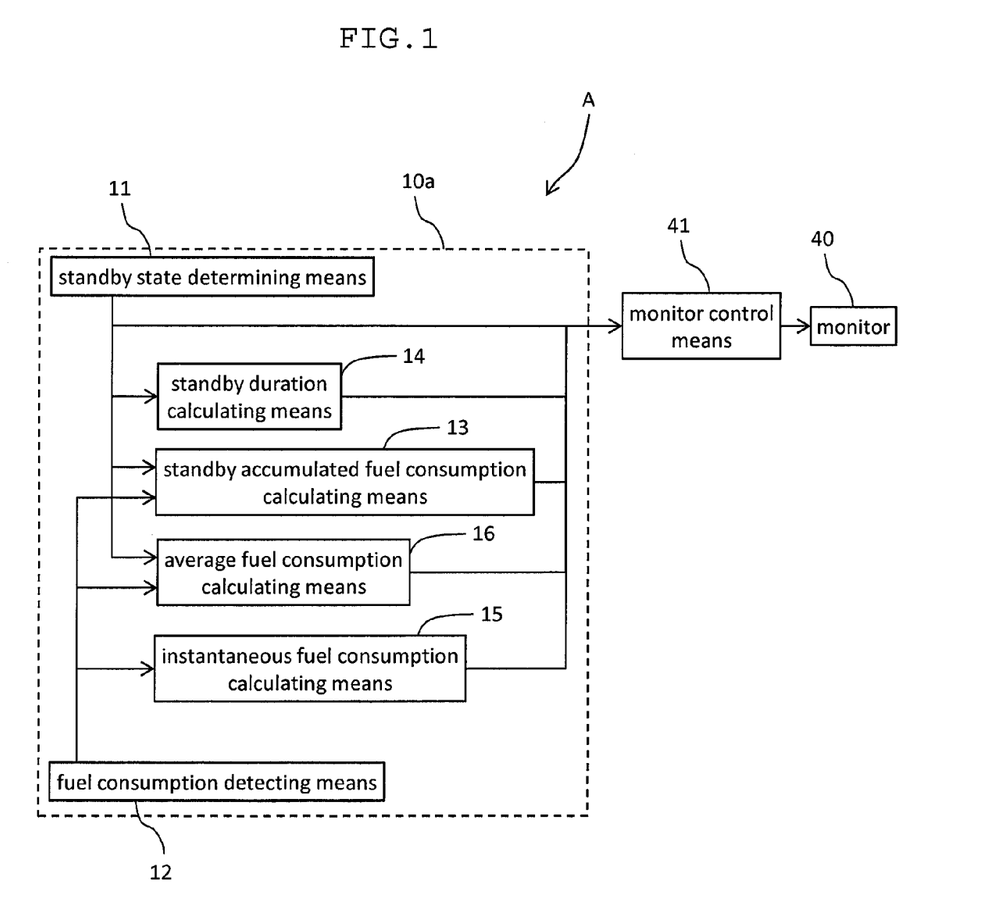
FIG. 1 is a block diagram showing a fuel consumption display apparatus for a crane according to an embodiment of the present invention.

As shown in FIG. 1, the fuel consumption display apparatus A for a crane includes measuring means 10a for measuring standby accumulated fuel consumption, standby duration, instantaneous fuel consumption and average fuel consumption, and a monitor 40 for displaying the standby accumulated fuel consumption, the standby duration, the instantaneous fuel consumption and the average fuel consumption measured by the measuring means 10a. Also, the measuring means 10a includes standby state determining means 11, fuel consumption detecting means 12, standby accumulated fuel consumption calculating means 13, standby duration calculating means 14, instantaneous fuel consumption calculating means 15 and average fuel consumption calculating means 16. Monitor control means 41 is further provided between the measuring means 10a and the monitor 40.

The monitor 40 is provided in a crane cab, so that an operator can confirm a screen displayed on the monitor 40.

If the fuel consumption display apparatus A for a crane is provided on a mobile crane, it is necessary to determine whether the mobile crane is in a crane operable mode or in a running mode. In this case, the determination of whether the mobile crane is in the crane operable mode or not is made based on operation information of a power take-off apparatus of the mobile crane, and each means operates as described below in the crane operable mode.

The standby state determining means 11 determines whether the crane is in a standby state or not during a crane operable mode. The standby state here indicates a no-operation state of the crane. More specifically, velocities are 0 at the times of expanding/contracting or derricking a boom, tilting a jib, causing a winch to perform a winding or lowering operation, revolving a superstructure, extending or retracting outriggers, and the like.

An attitude sensor is connected to the standby state determining means 11. Since the attitude sensor can detect a boom length, an angle or the like of the crane, the determination of whether the crane is in the standby state or not is made based on results detected by the attitude sensor.

A pressure sensor for detecting pilot pressure of a hydraulic operation circuit for a crane may be used instead of the attitude sensor. Although the attitude sensor delays the determination of the operation and has a dead zone, these problems are reduced by using the pressure sensor. In the case of an electric operation, a no-operation state may be detected by an electric signal of an operating system thereof.

Further, the standby state may be defined as a no-operation state as well as a no-load state of the crane. In this case, a sensor for detecting a load state is connected to the standby state detecting means 11 in addition to the aforementioned attitude sensor and pressure sensor.

The fuel consumption detecting means 12 measures an amount of fuel consumed per unit time by the crane (fuel consumption). For example, the fuel consumption detecting means 12 calculates the fuel consumption from instantaneous fuel consumption (a command value of fuel injection quantity of an engine) obtained by an engine control unit. Alternately, the fuel consumption detecting means 12 may include a sensor for measuring an amount of fuel remaining in a fuel tank and a calculating unit for calculating an amount of fuel consumed per unit time from the remaining amount of the fuel measured by the sensor.

The standby accumulated fuel consumption calculating means 13 receives an input of the standby state from the standby state determining means 11, and an input of the fuel consumption from the fuel consumption detecting means 12. The standby accumulated fuel consumption calculating means 13 calculates standby accumulated fuel consumption by accumulating the fuel consumption detected by the fuel consumption detecting means 12 after the standby state determining means 11 determines the crane to be in the standby state. The standby accumulated fuel consumption here indicates an accumulated value of an amount of fuel consumed by the crane during standby time in the crane operable mode.

The standby accumulated fuel consumption calculating means 13 resets the standby accumulated fuel consumption to 0 when the crane turns into an operational state from the standby state.

The standby duration calculating means 14 receives an input of the standby state from the standby state determining means 11. The standby duration calculating means 14 has a clock inside, which calculates standby duration by measuring a time period after the standby state determining means 11 determines the crane to be in the standby state. The standby duration here indicates standby duration in the crane operable mode.

The standby duration calculating means 14 resets the standby duration to 0 when the crane turns into the operational state from the standby state.

The instantaneous fuel consumption calculating means 15 receives an input of the fuel consumption from the fuel consumption detecting means 12. The instantaneous fuel consumption calculating means 15 calculates instantaneous fuel consumption from the fuel consumption. Since the fuel consumption indicates an amount of fuel consumed per unit time by the crane, the calculation is performed only by multiplying a predetermined coefficient. The instantaneous fuel consumption here indicates instantaneous fuel consumption in the crane operable mode.

The average fuel consumption calculating means 16 receives an input of the standby state from the standby state determining means 11, and an input of the fuel consumption from the fuel consumption detecting means 12. In order to detect a start time of the crane operable mode, for example, operation information of the power take-off apparatus is input and the start time of the crane operable mode is detected when the power take-off apparatus is turned on. The average fuel consumption calculating means 16 has a clock inside, which measures an operational time, that is, a time period from the start time of the crane operable mode up to the present or a time period from the crane turning from the standby state into the operational state up to the present in the case of the crane turning into the standby state once. The average fuel consumption calculating means 16 also calculates accumulated fuel consumption by accumulating the fuel consumption after the start time of the crane operable mode or after the crane turns into the operational state from the standby state. The average fuel consumption calculating means 16 then calculates average fuel consumption by dividing the operational time by the accumulated fuel consumption. The average fuel consumption here indicates average fuel consumption from the start time of the crane operable mode or the moment when the crane turns into the operational state from the standby state up to the present. The average fuel consumption may be obtained by dividing the accumulated fuel consumption by the operational time (L/min) or by dividing the workload of the crane by the accumulated fuel consumption (tm/L) other than the one obtained by dividing the operational time by the accumulated fuel consumption (min/L).

The average fuel consumption calculating means 16 resets the average fuel consumption to 0 when the crane turns into the standby state from the operational state.

The monitor control means 41 receives an input of the standby accumulated fuel consumption from the standby accumulated fuel consumption calculating means 13, an input of the standby duration from the standby duration calculating means 14, an input of the instantaneous fuel consumption form the instantaneous fuel consumption calculating means 15, an input of the average fuel consumption from the average fuel consumption calculating means 16, and input of the standby state from the standby state determining means 11.

The monitor control means 41 then displays the instantaneous fuel consumption and the average fuel consumption on the monitor 40 as long as the crane is not in the standby state. On the other hand, the monitor control means 41 displays the standby accumulated fuel consumption and the standby duration on the monitor 40 as long as the crane is in the standby state.

Next, a screen displayed on the monitor 40 will be described.

Figure 2:
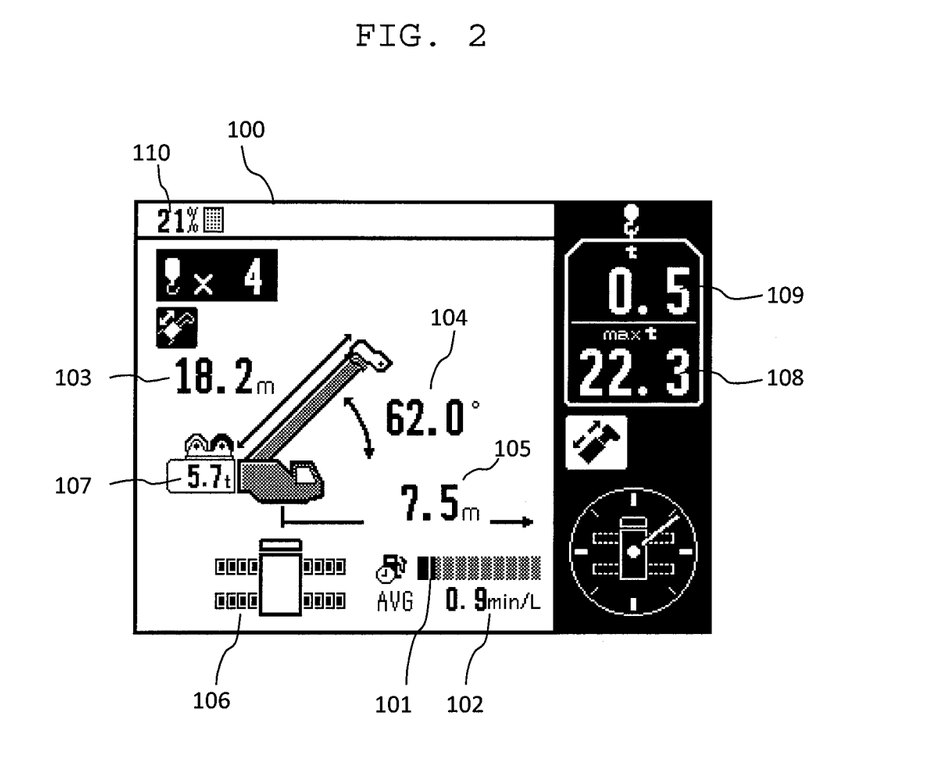
FIG. 2 is an image of a normal screen in a crane operable mode.

As shown in FIG. 2, the monitor 40 displays a normal screen 100 during the crane being in the operational state, namely a state with the crane operating during the power take-off apparatus being turned on. The normal screen 100 displays a bar graph 101 for instantaneous fuel consumption and average fuel consumption 102.

The bar graph 101 for instantaneous fuel consumption indicates instantaneous fuel consumption as a bar graph. A unit of the average fuel consumption 102 may be L/min, hour/G, or G/hour other than min/L. These units may be changed by working with a system of units for changing a unit depending on a destination of the crane.

The monitor 40 is common to a monitor of an over load limiter provided on the crane. The normal screen 100 displays various kinds of information of the over load limiter other than the bar graph 101 for instantaneous fuel consumption and the average fuel consumption 102. The information of the over load limiter includes a boom length 103, a boom derricking angle 104, a load radius 105, a width of extended outriggers 106, counterweight weight 107, a rated load 108, a suspended load 109 and a load factor 110. The load factor 110 here indicates a ratio of the suspended load 109 to the rated load 108.

As described above, by making the monitor 40 common to the monitor of the over load limiter, there is no need for providing a plurality of monitors in a crane cab leading to saving in space, as well as the operator can obtain a large amount of information at a glance.

Figure 3:
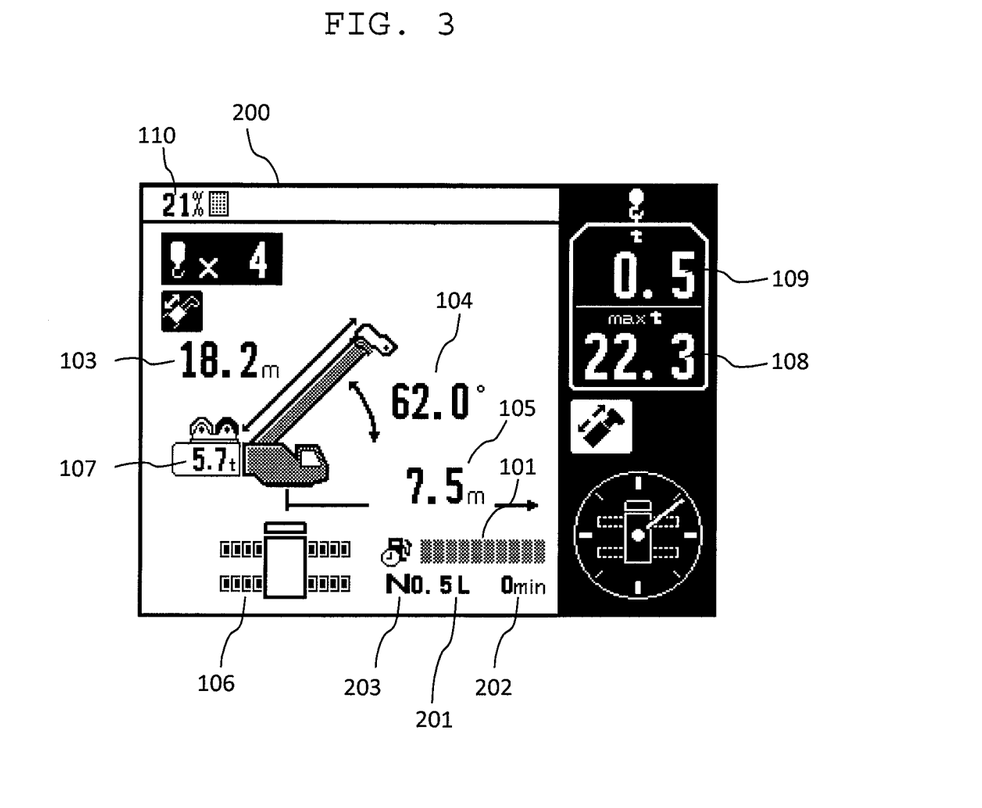
FIG. 3 is an image of a standby screen in the crane operable mode.

When the standby state determining means 11 determines the crane to be in the standby state, the monitor control means 41 changes the normal screen 100 displayed on the monitor 40 to a standby screen 200 shown in FIG. 3.

The standby screen 200 displays standby accumulated fuel consumption 201, standby duration 202 and a standby icon 203 indicating a standby state in an area where the average fuel consumption 102 is displayed on the normal screen 100. In order to indicate that the fuel consumption during the standby state is wasteful, the bar graph 101 for instantaneous fuel consumption is displayed in gray as a whole. The configuration other than this is similar to that of the normal screen 100. Various kinds of information of the over load limiter are also displayed.

A value of the standby accumulated fuel consumption 201 is displayed up to a first decimal place in the case of the value less than 10 L, while a decimal place is not displayed in the case of the value not less than 10 L. Additionally, a unit of the standby accumulated fuel consumption 201 may be G (gallon) instead of L (liter). These units may be changed by working with a system of units for changing a unit depending on a destination of the crane.

Such a configuration allows the monitor 40 to display the standby accumulated fuel consumption 201 and the standby duration 202 every time the crane turns into the standby state. The operator of the crane can therefore recognize how much fuel is wasted, thus facilitating an operation for reducing fuel consumption.

The monitor control means 41 preferably changes the normal screen 100 displayed on the monitor 40 to the standby screen 200 after a predetermined period of time, for example 3 minutes, has elapsed since the standby state determining means 11 determines the crane to be in the standby state.

Accordingly, even if the crane turns into a no-operation state for a short period of time during the crane operation, frequent changes between the normal screen 100 and the standby screen 200 in an alternate manner can be prevented.

(History of Fuel Consumption)

Next, in the case of displaying a history of fuel consumption will be described.

Figure 4:
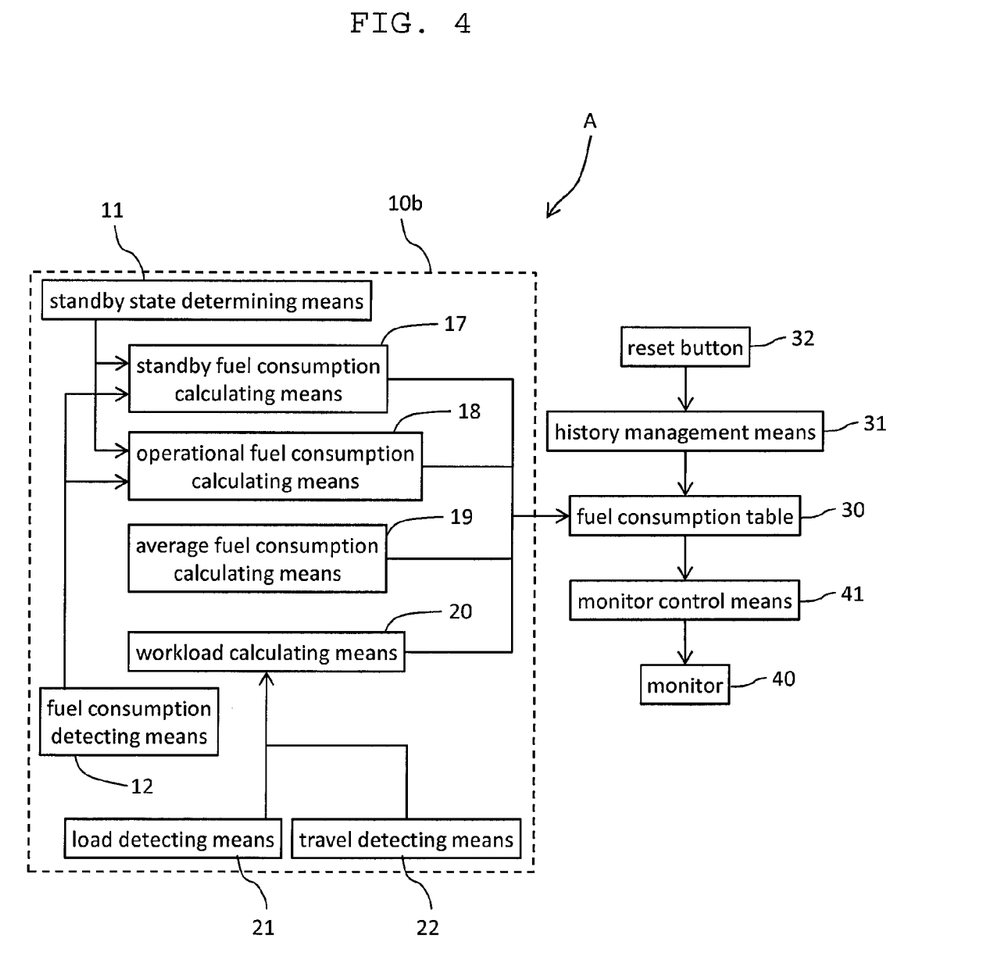
FIG. 4 is a block diagram showing a fuel consumption display apparatus for a crane according to the embodiment of the present invention.

As shown in FIG. 4, the fuel consumption display apparatus A for a crane includes measuring means 10b for measuring standby fuel consumption, operational fuel consumption, average fuel consumption and a workload, and a fuel consumption table 30 for storing the standby fuel consumption, the operational fuel consumption, the average fuel consumption and the workload measured by the measuring means 10b as a history per a certain period of time in addition to the configuration shown in FIG. 1. The monitor 40 displays the history of the standby fuel consumption, the operational fuel consumption, the average fuel consumption and the workload stored in the fuel consumption table 30. The measuring means 10b also includes standby state determining means 11, fuel consumption detecting means 12, standby fuel consumption calculating means 17, operational fuel consumption calculating means 18, average fuel consumption calculating means 19, workload calculating means 20, load detecting means 21 and travel detecting means 22. Further, a history management means 31 is accessible to the fuel consumption table 30. Monitor control means 41 is provided between the fuel consumption table 30 and the monitor 40.

Figure 5:
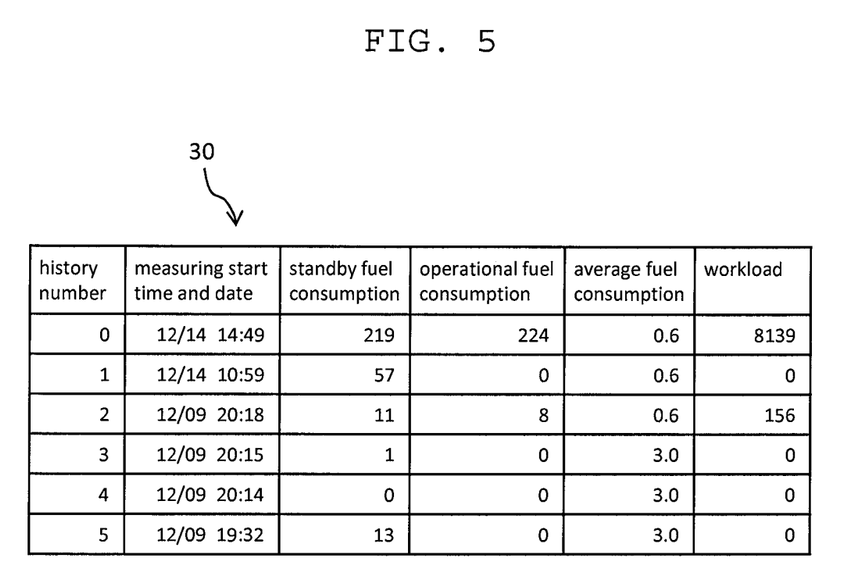
FIG. 5 is a diagram showing a fuel consumption table.

As shown in FIG. 5, the fuel consumption table 30 has six columns of a history number, a measuring start time and date, standby fuel consumption, operational fuel consumption, average fuel consumption and a workload. The fuel consumption table 30 also has six rows having history numbers 0 to 5 stored. The history number 0 here indicates a present time, while the history numbers 1 to 5 indicate past histories. The number closer to 1 is a history closer to the present time. Although five histories are stored in the embodiment, histories to be stored may be more than or less than five.

Rows corresponding to the history numbers 0 to 5 store values of measuring start times and dates, standby fuel consumption, operational fuel consumption, average fuel consumption and workloads in the histories. Note that the values shown in FIG. 5 are examples.

The row corresponding to the history number 0 is updated according to values calculated by the standby fuel consumption calculating means 17, the operational fuel consumption calculating means 18, the average fuel consumption calculating means 19 and the workload calculating means 20. The detailed description will be made later.

The history management means 31 operates the fuel consumption table 30 to create the rows corresponding to the history numbers 1 to 5.

More specifically, the history management means 31 receives an input signal from a reset button 32 described later. When the reset button 32 is pressed, the history management means 31 deletes the row of the history number 5, and updates the history number 4 to the history number 5, the history number 3 to the history number 4, the history number 2 to the history number 3, the history number 1 to the history number 2 and the history number 0 to the history number 1. The history management means 31 then adds the row of the history number 0, and sets a measuring start time and date of the row to be the time and date for the reset button 32 being pressed, while sets all of the standby fuel consumption, operational fuel consumption, average fuel consumption and workload to be 0.

Histories are successively updated in such a manner. As described above, the standby fuel consumption, operational fuel consumption, average fuel consumption and workload in the row of the history number 0 are updated according to current values.

Each means of the fuel consumption display apparatus A for a crane will be described with reference to FIG. 4.

If the fuel consumption display apparatus A for a crane is provided on a mobile crane, it is necessary to determine whether the mobile crane is in a crane operable mode or in a running mode. In this case, the determination of whether the mobile crane is in the crane operable mode or not is made based on operation information of the power take-off apparatus of the mobile crane, and each means operates as described below in the crane operable mode.

Since the standby state determining means 11 and the fuel consumption detecting means 12 are similar to those of the measuring means 10a, the description will be omitted.

The standby fuel consumption calculating means 17 receives an input of a standby state from the standby state determining means 11, and an input of fuel consumption from the fuel consumption detecting means 12. The standby fuel consumption calculating means 17 calculates standby fuel consumption by accumulating the fuel consumption detected by the fuel consumption detecting means 12 as long as the standby state determining means 11 determines the crane to be in the standby state from a measuring start time up to the present. The standby fuel consumption here indicates an accumulated value of an amount of fuel consumed by the crane during standby time in the crane operable mode.

More specifically, the standby fuel consumption calculating means 17 refers to the fuel consumption table 30 for standby fuel consumption of the row corresponding to the history number 0. The standby fuel consumption calculating means 17 then obtains the latest standby fuel consumption by adding the fuel consumption detected by the fuel consumption detecting means 12 to the referred value to update the fuel consumption table 30 according to the latest standby fuel consumption. These operations are performed as long as the standby state determining means 11 determines the crane to be in the standby state. The standby fuel consumption of the fuel consumption table 30 can therefore be updated in such a manner.

The operational fuel consumption calculating means 18 receives an input of the standby state from the standby state determining means 11, and an input of the fuel consumption from the fuel consumption detecting means 12. The operational fuel consumption calculating means 18 calculates operational fuel consumption by accumulating the fuel consumption detected by the fuel consumption detecting means 12 as long as the standby state determining means 11 determines the crane not to be in the standby state from the measuring start time up to the present. The operational fuel consumption here indicates an accumulated value of an amount of fuel consumed by the crane during operation in the crane operable mode.

More specifically, the operational fuel consumption calculating means 18 refers to the fuel consumption table 30 for operational fuel consumption of the row corresponding to the history number 0. The operational fuel consumption calculating means 18 then obtains the latest operational fuel consumption by adding the fuel consumption detected by the fuel consumption detecting means 12 to the referred value to update the fuel consumption table 30 according to the latest operational fuel consumption. These operations are performed as long as the standby state determining means 11 determines the crane to be in the standby state. The operational fuel consumption of the fuel consumption table 30 can therefore be updated in such a manner.

The average fuel consumption calculating means 19 calculates an operational time by referring to the fuel consumption table 30 for a measuring start time and date of the row corresponding to the history number 0 and by subtracting the measuring start time and date from the current time and date. The average fuel consumption calculating means 19 also calculates accumulated fuel consumption by referring to the fuel consumption table 30 for standby fuel consumption and operational fuel consumption of the row corresponding to the history number 0 and by adding them together. The average fuel consumption calculating means 19 then calculates average fuel consumption by dividing the operational time by the accumulated fuel consumption to update, according to the obtained value, average fuel consumption of the row corresponding to the history number 0 of the fuel consumption table 30. The average fuel consumption here indicates average fuel consumption from the measuring start time up to the present. The operational time may be derived from accumulating time after the measuring start time and date, while the accumulated fuel consumption may be derived from accumulating the fuel consumption detected by the fuel consumption detecting means 12 from the measuring start time up to the present. Additionally, the average fuel consumption may be obtained by dividing the accumulated fuel consumption by the operational time (L/min) or by dividing the workload of the crane by the accumulated fuel consumption (tm/L) other than the one obtained by dividing the operational time by the accumulated fuel consumption (min/L).

The average fuel consumption calculating means 19 calculates average fuel consumption from the measuring start time up to the present irrespective of the standby state determining means 11 determining whether or not the crane is in the standby state.

The load detecting means 21 and the travel detecting means 22 are connected to the workload calculating means 20. The workload calculating means 20 calculates a workload by multiplying an actual load (including a load of a lifting device) detected by the load detecting means 21 and an amount of travel detected by the travel detecting means 22. The workload calculating means 20 then refers to the fuel consumption table 30 for a workload of the row corresponding to the history number 0. The workload calculating means 20 then obtains the latest workload by adding the referred value to the workload obtained by the calculation to update the fuel consumption table 30 according to the latest workload. The workload here indicates the product of an actual load of a suspended cargo for the crane and three-dimensional travel of the suspended cargo.

The load detecting means 21 detects an actual load of the suspended cargo for the crane (including a load of a lifting device).

The travel detecting means 22 includes a sensor for detecting an RPM of a winch drum, expansion/contraction and derricking of a boom, expansion/contraction and tilt of a jib, and revolving of a superstructure. The travel detecting means 22 detects three-dimensional travel of the suspended cargo from a value detected by each sensor. For example, the travel is derived from the RPM of the winch drum by multiplying a circumference of the winch drum considering a wound layer of wire by the RPM of the winch drum.

The monitor control means 41 refers to the fuel consumption table 30 and displays a history of the standby fuel consumption, the operational fuel consumption, the average fuel consumption, and the workload stored in the fuel consumption table 30 on the monitor 40.

Next, a screen displayed on the monitor 40 will be described.

When the monitor 40 displays the aforementioned normal screen 100 or standby screen 200, an operator presses a not-shown display change button. The monitor control means 41 then changes a display of the monitor 40 to a bar graph display screen 300 shown in FIG. 6.

Figure 6:
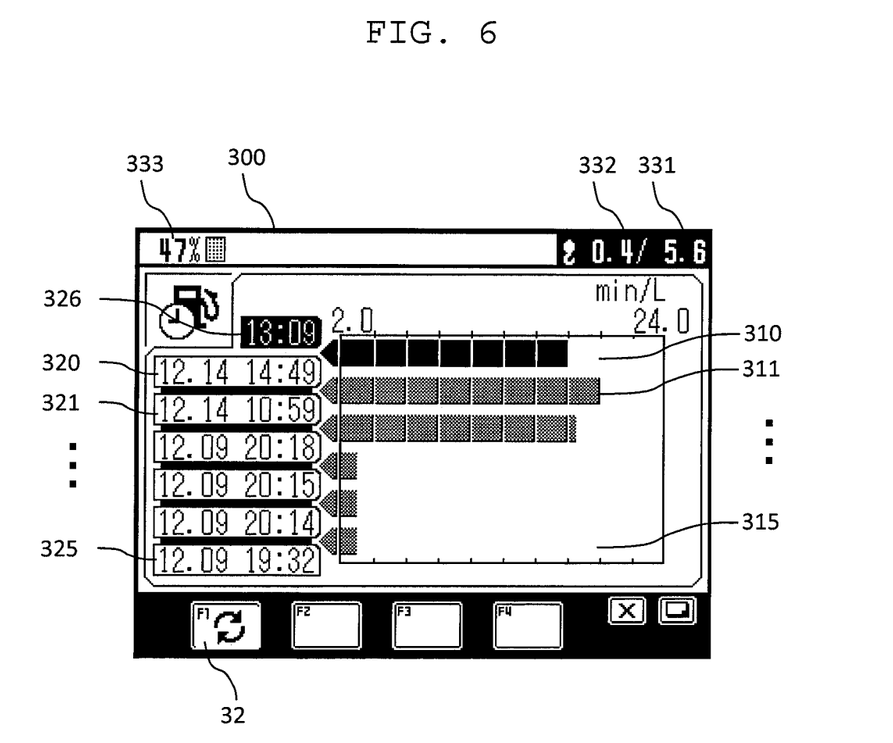
FIG. 6 is an image of a bar graph display screen.

As shown in FIG. 6, the bar graph display screen 300 displays average fuel consumption of the row corresponding to the history number 0 in the fuel consumption table 30 as current average fuel consumption 310 in a bar graph, and displays average fuel consumption of the rows corresponding to the history numbers 1 to 5 as five histories of average fuel consumption 311 to 315 in the bar graph. The current average fuel consumption 310 is displayed in black, while the average fuel consumption 311 to 315 of the histories are displayed in gray, thereby allowing a easy distinction between the present and histories.

A unit of the average fuel consumption 310 to 315 may be hour/L, hour/G, min/G or tm/h other than min/L. These units may be changed by working with a system of units for changing a unit depending on a destination of the crane.

As described above, the monitor 40 is common to a monitor of the over load limiter provided on the crane. The bar graph display screen 300 therefore displays various kinds of information of the over load limiter other than the aforementioned information. The information of the over load limiter includes a rated load 331, a suspended load 332 and a load factor 333. The load factor 333 here indicates a ratio of the suspended load 332 to the rated load 331.

Accordingly, by making the monitor 40 common to the monitor of the over load limiter, there is no need for providing a plurality of monitors in a crane cab leading to saving in space, as well as the operator can obtain a large amount of information at a glance.

In the bar graph, the vertical axis shows measuring start times and dates 320 to 325 of the rows corresponding to the histories 0 to 5 in the fuel consumption table 30. More specifically, for example, the average fuel consumption 311 is displayed between the measuring start times and dates 320 and 321. This is because the measuring start time and date 320 corresponds to the measuring start time and date of the history number 0 (the current average fuel consumption 310) as well as to a measuring finish time and date of the history number 1 (the average fuel consumption 311 of the closest history). The cases of the average fuel consumption 312 to 315 of the other histories are similar to that of the average fuel consumption 311. The current average fuel consumption 310 is displayed between the measuring start time and date 320 and a current time 326.

The monitor 40 is provided with the reset button 32. Pressing the reset button 32 causes the history management means 31 to operate, thus newly setting a measuring start time and date to display a measurement result from the measuring start time and date as the current average fuel consumption 310. The average fuel consumption 311 to 315 of the histories is sequentially moved down.

As described above, pressing the reset button 32 enables a setting of a measurement period at any length.

Figure 7:
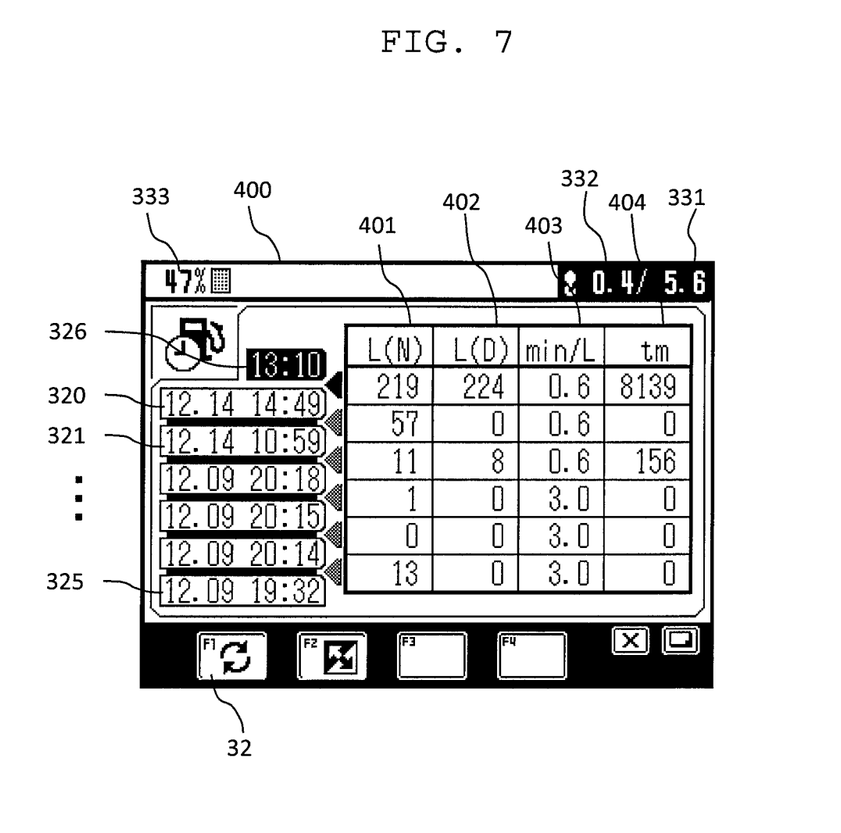
FIG. 7 is an image of a table display screen.

When the operator presses a not-shown display changing button, the monitor control means 41 changes the bar graph display screen 300 displayed on the monitor 40 to a table display screen 400 show in FIG. 7.

The table display screen 400 displays a table listing standby fuel consumption 401, operational fuel consumption 402, average fuel consumption 403 and a workload 404 in an area where the bar graph showing the average fuel consumption 310 to 315 is displayed on the bar graph display screen 300. The configuration other than this is similar to that of the bar graph display screen 300. Various kinds of information of the over load limiter are also displayed.

A unit of the standby fuel consumption 401 and the operational fuel consumption 402 may be G (gallon) instead of L (liter), while a unit of average fuel consumption 403 may be hour/G instead of min/L. These units may be changed by working with a system of units for changing a unit depending on a destination of the crane.

In the table display screen 400, pressing the reset button 32 also causes the history management means 31 to operate, thus newly setting a measuring start time and date to display a measurement result from the measuring start time and date as the standby fuel consumption 401, the operational fuel consumption 402, the average fuel consumption 403 and the workload 404 at present. The histories are also sequentially moved down.

In the case where any of the standby fuel consumption 401, the operational fuel consumption 402, the average fuel consumption 403 and the workload 404 exceeds 9999 of a display limit value, the situation becomes similar to the state with the reset button 32 pressed.

Furthermore, when the reset button 32 is pressed either at the bar graph display screen 300 or the table display screen 400, the histories are sequentially moved down at the both screens.

According to the above configuration, the operator can evaluate efficiency of the fuel consumption of the crane operation by checking an amount of fuel usage with respect to a workload of the crane. Further, the operator can comprehend the efficiency of the fuel consumption of the crane operation by comparing with fuel consumption during a past operation, thus facilitating the operation for reducing fuel consumption.

REFERENCE SIGNS LIST 10a, 10b measuring means
11 standby state determining means
12 fuel consumption detecting means
13 standby accumulated fuel consumption calculating means
14 standby duration calculating means
15 instantaneous fuel consumption calculating means
16 average fuel consumption calculating means
17 standby fuel consumption calculating means
18 operational fuel consumption calculating means
19 average fuel consumption calculating means
20 workload calculating means
21 load detecting means 22 travel detecting means
30 fuel consumption table
31 history management means
32 reset button
40 monitor
41 monitor control means

What is claimed is:

1. A fuel consumption display apparatus for a crane, which is selectably in an operational state or in a standby state during operable mode in which an operation can be performed using the crane, the fuel consumption display apparatus comprising:
  a standby accumulated fuel consumption calculator, which calculates standby accumulated fuel consumption by accumulating fuel consumption in the standby state during the crane operable mode,
  a standby duration calculator, which calculates standby duration in the standby state during the crane operable mode;
  an instantaneous fuel consumption calculator, which calculates instantaneous fuel consumption in the operational state during the crane operable mode;
  an average fuel consumption calculator, which calculates average fuel consumption in the operational state during the crane operable mode;
  a standby state determining device, which determines whether or not the crane is in the standby state during the crane operable mode;
  a monitor having a monitor controller, for displaying the standby accumulated fuel consumption, the standby duration, the instantaneous fuel consumption, and the average fuel consumption; and
  wherein the monitor controller performs control to display the instantaneous fuel consumption and the average fuel consumption on the monitor as long as the standby state determining device determines the crane not to be in the standby state and to display the standby accumulated fuel consumption and the standby duration on the monitor as long as the standby state determining device determines the crane to be in the standby state, and to display the standby accumulated fuel consumption and the standby duration on the monitor after a predetermined period of time has elapsed since the standby state determining device determines the crane to be in the standby state.

2. The fuel consumption display apparatus for the crane according to claim 1, further comprising
  a fuel consumption detector, which detects the fuel consumption of the crane;
  wherein the standby accumulated fuel consumption calculator calculates the standby accumulated fuel consumption by accumulating the fuel consumption after the standby state determining device determines the crane to be in the standby state, and the standby duration calculator calculates the standby duration by measuring a time period after the standby state determining device determines the crane to be in the standby state, and
  wherein the monitor comprises the monitor controller displays, on the monitor, the standby accumulated fuel consumption input from the standby accumulated fuel consumption calculator and the standby duration input from the standby duration calculator.

3. The fuel consumption display apparatus for the crane according to claim 1, further including;
  a fuel consumption detector, which detects the fuel consumption of the crane
  wherein the instantaneous fuel consumption calculator calculates the instantaneous fuel consumption from the fuel consumption, and
  the average fuel consumption calculator calculates the average fuel consumption from an operational time and accumulated fuel consumption by measuring the operational time, namely a time period from the crane turning into the operational state up to the present, and by accumulating the fuel consumption after the crane turning into the operational state for calculating the accumulated fuel consumption,
  wherein the monitor controller displays, on the monitor, the instantaneous fuel consumption input from the instantaneous fuel consumption calculator and the average fuel consumption input from the average fuel consumption calculator.

4. A fuel consumption display apparatus for the crane, which is selectably in an operational state or in a standby state during the crane operable mode, in which an operation can be performed using the crane, the fuel consumption display apparatus comprising:
  standby fuel consumption calculator, which calculates standby fuel consumption in the standby state during the crane operable mode,
  an operational fuel consumption calculator, which calculates operational fuel consumption in the operational state during the crane operable mode,
  an average fuel consumption calculator, which calculates average fuel consumption, and
  a workload calculator, which calculates a workload;
  a fuel consumption table for storing the standby fuel consumption, the operational fuel consumption, the average fuel consumption and the workload as a history per a certain period of time, which is determined by pressing a reset button; and
  a monitor for displaying history of the standby fuel consumption, the operational fuel consumption, the average fuel consumption and the workload stored in the fuel consumption table.

5. The fuel consumption display apparatus for the crane according to claim 4, further including:
  a standby state determining device, which determines whether or not the crane is in a standby state during the crane operable mode;
  a fuel consumption detector, which detects fuel consumption of the crane;
  a standby fuel consumption calculator, which calculates the standby fuel consumption by accumulating the fuel consumption as long as the standby state determining device determines the crane to be in the standby state from a measuring start time up to the present;
  an operational fuel consumption calculator, which calculates the operational fuel consumption by accumulating the fuel consumption as long as the standby state determining device determines the crane not to be in the standby state from the measuring start time up to the present;
  an average fuel consumption calculator, which calculates the average fuel consumption by measuring an operational time, namely a time period from the measuring start time up to the present, by adding the operational fuel consumption to the standby fuel consumption for calculating accumulated fuel consumption, and by dividing the operational time by the accumulated fuel consumption; and
  a workload calculator for calculating a workload from the measuring start time up to the present.

6. A crane comprising: a fuel consumption display apparatus for the crane according to claim 1.

7. A crane comprising: a fuel consumption display apparatus for the crane according to claim 4.

* * * * *